United States Patent [19]

Parulski et al.

[11] Patent Number: 5,506,617
[45] Date of Patent: Apr. 9, 1996

[54] ELECTRONIC CAMERA INCORPORATING A COMPUTER-COMPATIBLE BUS INTERFACE

[75] Inventors: Kenneth Parulski; Raymond J. Bouvy; David A. Smith, all of Rochester; John J. Acello, East Rochester, all of N.Y.

[73] Assignee: Eastman Kodak Company, Rochester, N.Y.

[21] Appl. No.: 988,560

[22] Filed: Dec. 10, 1992

[51] Int. Cl.⁶ .................................................. H04N 5/225
[52] U.S. Cl. ............................................ 348/207; 348/552
[58] Field of Search ..................... 354/75, 76; 358/209, 358/903, 906, 909; 364/513, 514; 348/552, 207, 373, 375

[56] References Cited

U.S. PATENT DOCUMENTS

| | | | |
|---|---|---|---|
| 4,425,586 | 1/1984 | Miller | 358/335 |
| 4,545,068 | 10/1985 | Tabata et al. | 382/41 |
| 4,587,633 | 5/1986 | Wang | 364/900 |
| 4,589,020 | 5/1986 | Akatsuka | 358/160 |
| 5,138,459 | 8/1992 | Roberts et al. | 358/209 |
| 5,182,647 | 1/1993 | Chang | 358/213.11 |
| 5,231,501 | 7/1993 | Sakai | 358/209 |
| 5,258,859 | 11/1993 | Wada et al. | 358/487 |

*Primary Examiner*—Wendy R. Greening
*Attorney, Agent, or Firm*—David M. Woods

[57] ABSTRACT

An electronic camera is provided as a module that attaches to the signal bus of a PC-compatible computer. The camera includes a minimum of components, particularly an image sensor and an A/D converter, and a PC-compatible interface connector for mating with a bus extension connector on the computer. By directly presenting digitized data from the camera to the signal bus of the computer through the bus connector, the camera can be kept relatively simple and the computer can be relied upon to perform image processing, storage, and display.

26 Claims, 10 Drawing Sheets

| | | | | |
|---|---|---|---|---|
| GROUND | | B1 | A1 | < -I/O CH CK |
| RESET | < | B2 | A2 | < > SD7 |
| +5 VOLTS | | B3 | A3 | < > SD6 |
| IRQ2 | > | B4 | A4 | < > SD5 |
| −5 VOLTS | | B5 | A5 | < > SD4 |
| DRQ1 | > | B6 | A6 | < > SD3 |
| −12 VOLTS | | B7 | A7 | < > SD2 |
| −0WS | > | B8 | A8 | < > SD1 |
| +12 VOLTS | | B9 | A9 | < > SD0 |
| GROUND | | B10 | A10 | < I/O CH RDY |
| −SMEMW | < | B11 | A11 | < AEN |
| −SMEMR | < | B12 | A12 | < > SA19 |
| −IOW | < | B13 | A13 | < > SA18 |
| −IOR | < | B14 | A14 | < > SA17 |
| −DACK3 | < | B15 | A15 | < > SA16 |
| DRQ3 | > | B16 | A16 | < > SA15 |
| −DACK1 | < | B17 | A17 | < > SA14 |
| DRQ1 | > | B18 | A18 | < > SA13 |
| −DACK0 | < | B19 | A19 | < > SA12 |
| CLK | < | B20 | A20 | < > SA11 |
| IRQ7 | > | B21 | A21 | < > SA10 |
| IRQ6 | > | B22 | A22 | < > SA9 |
| IRQ5 | > | B23 | A23 | < > SA8 |
| IRQ4 | > | B24 | A24 | < > SA7 |
| IRQ3 | > | B25 | A25 | < > SA6 |
| −DACK2 | < | B26 | A26 | < > SA5 |
| T/C | < | B27 | A27 | < > SA4 |
| BALE | < | B28 | A28 | < > SA3 |
| +5 VOLTS | | B29 | A29 | < > SA2 |
| OSC | < | B30 | A30 | < > SA1 |
| GROUND | | B31 | A31 | < > SA0 |

FIG. 6

| | | |
|---|---|---|
| −MEM CS16 > | D1 C1 | > SBHE |
| −I/O CS16 > | D2 C2 | < > LA23 |
| IRQ10 > | D3 C3 | < > LA22 |
| IRQ11 > | D4 C4 | < > LA21 |
| IRQ12 > | D5 C5 | < > LA20 |
| IRQ15 > | D6 C6 | < > LA19 |
| IRQ14 > | D7 C7 | < > LA18 |
| −DACK0 < | D8 C8 | < > LA17 |
| DRQ0 > | D9 C9 | > −MEMR |
| −DACK5 < | D10 C10 | > −MEMW |
| DRQ5 > | D11 C11 | < > SD08 |
| −DACK6 < | D12 C12 | < > SD09 |
| DRQ6 > | D13 C13 | < > SD10 |
| −DACK7 < | D14 C14 | < > SD11 |
| DRQ7 > | D15 C15 | < > SD12 |
| +5 VOLTS | D16 C16 | < > SD13 |
| −MASTER > | D17 C17 | < > SD14 |
| GROUND | D18 C18 | < > SD15 |

ELECTRONIC CAMERA INCORPORATING A COMPUTER-COMPATIBLE BUS INTERFACE

FIELD OF INVENTION

This invention pertains to the field of electronic imaging and, more particularly, to an image acquisition peripheral operated as an input device to a portable computer.

BACKGROUND OF THE INVENTION

It is well known to use a video camera with a computer frame grabber. A typical system employs a video motion camera (such as the CCD 4000 RGB Flash-Sync Camera manufactured by Eastman Kodak Co., Rochester, N.Y.) and a frame grabber board (such as a TARGA(™) frame store board manufactured by True Vision, Inc., Indianapolis, Ind.) attached to the PC bus of a personal computer. The camera provides the timing to interface with the video frame store board by activating the frame acquire line of the frame store board whenever an external voltage input to the camera is dropped low (e.g., by dropping the "Camera Acquire In" line to the CCD 4000 camera). It is customary to design software to activate the camera's frame acquire line from the computer. To capture an image into the computer in such a customary application, the operator frames the subject while observing the live camera output on a video monitor, and then interacts with the computer keyboard at the proper moment.

Another approach to computer image acquisition is described in U.S. Ser. No. 805,220, entitled "Hand-Manipulated Electronic Camera Tethered to a Personal Computer," which was filed Dec. 11, 1991 in the names of K. A. Parulski, R. H. Hamel, and J. J. Acello, and assigned to the assignee of the present application. In this system an electronic camera is coupled to a personal computer through a computer interface. In particular, a digital interface standard may be used, and images from the camera are input to the computer through a Small Computer System Interface (SCSI). The camera is preferably linked, or tethered, to the computer with a cable, thus allowing a certain amount of mobility for the camera independent of the computer.

Both of these known interfaces have drawbacks. The NTSC signal is an analog signal subject to noise, and additionally requires a special frame grabber card in the computer to decode and digitize the signal. The SCSI signal has a relatively low data rate and a complicated protocol, requiring an expensive SCSI interface integrated circuit in the camera. Notwithstanding such drawbacks, the system described in Ser. No. 805,220 provides a low cost electronic still camera which attaches to a personal computer that provides image processing, storage, and display. By relying on the computer to perform these tasks, the camera cost can be greatly reduced.

A customized high speed bus connection is described in U.S. Pat. No. 4,196,450 for transferring data between a scanner and a specialized processing system. A special architecture is required, including an interprocessor link between a low speed section, having a standard Intel 8080 microprocessor connected to a low speed data bus, and a high speed section having a high speed bus and high speed microprocessor for handling scan data from the scanner. As the scanner is moved across an image page, scan data is supplied to the high speed data bus. Communication between the high speed and the low speed sections is through the interprocessor link. The shortcoming of this arrangement is that a custom computer, including a non-compatible bus, must be built just to handle, process, and store images.

In all of these systems, there is need for a low cost means of digitally interfacing a small camera peripheral to a-portable computer at a rate higher than that provided by a SCSI interface or an RS-232 input, but without the attendant difficulties of either an analog frame grabbing process or a specialized, non-compatible computer architecture.

SUMMARY OF THE INVENTION

In accordance with the invention, an electronic camera operates in conjunction with a portable computer of the type having a plurality of digital devices, including a central processing unit (CPU) interconnected by a standardized, industry-compatible signal bus. The electronic camera includes an image sensor and means for digitizing image data output from the sensor. Means are provided for enabling attachment of the camera to the portable computer. The camera module further includes bus-compatible connection means for engaging the signal bus, and means for providing the digitized image data to the signal bus through the bus-compatible connection means when the camera is attached to the portable computer. In a preferred embodiment, the signal bus is a PC compatible bus and the connector means is a PC-compatible connector.

The advantage of the invention is that the camera can be designed as an inexpensive "clip-on" accessory that mates with a portable computer through its bus slot. The computer can be thus relied upon to perform image processing, storage, and display, and the cost of the camera may be accordingly reduced. The bus connection provides a high speed parallel interface for rapidly transferring image data from an image sensor to a memory device in the personal computer. In particular, by using an ISA (Industry Standard Architecture) bus, existing portable computer designs can be used, rather than requiring the development of a special computer incorporating a specialized bus architecture.

BRIEF DESCRIPTION OF THE DRAWINGS

The invention will be described in relation to the drawings in which.

DESCRIPTION OF THE PREFERRED EMBODIMENTS

Since electronic still cameras and computers, including pen-based computers, are well known, the present description will be directed in particular to elements forming part of, or cooperating more directly with, apparatus in accordance with the present invention. Elements not specifically shown or described may be selected from those known in the art.

Figure 1:
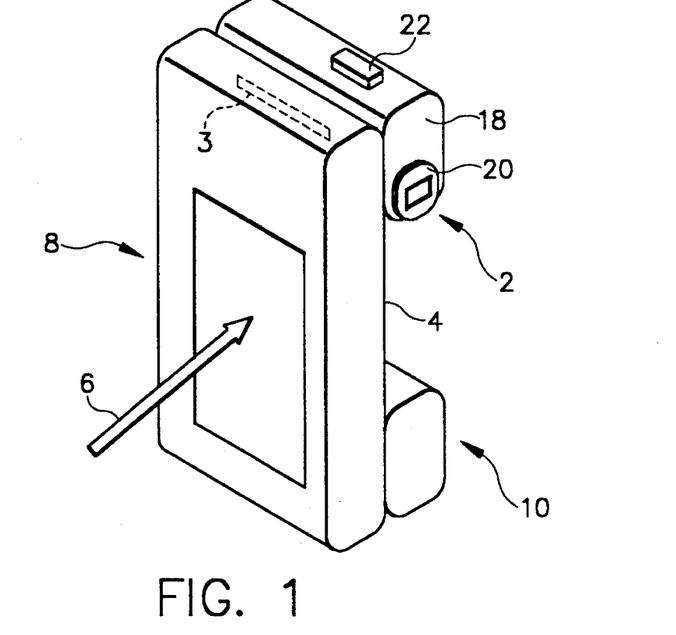
FIG. 1 is an illustration showing an electronic still camera attached to the bus extension connector of a pen-based computer in accordance with the invention.

Referring to FIG. 1, a camera module 2 is shown attached to a bus connector 3 of a portable computer 4, which provides image processing, storage, and display. (The bus connector 3 is shown in broken line to indicate that it is hidden from view due to its location between the module 2 and the computer 4.) The invention is not limited to a particular computer, although a preferred computer is a small, battery operated IBM compatible personal computer (PC). One type of computer which is especially suitable is a "pen-based" computer, which is a small, portable unit that uses a pen-type stylus 6, rather than a keyboard and/or a "mouse" input device, for controlling the computer and inputting data. Menus are selected and data is entered using the stylus 6 to point to selections displayed on a pressure sensitive LCD display 8.

Appropriate pen-based computers that could be adapted for use with the invention include the NCR System 3000 Model 3125 NotePad computer manufactured by the NCR Corporation, Dayton, Ohio or the GridPad SL computer manufactured by Grid, a division of Tandy Corporation, Fort Worth, Tex. Both of these computers are compatible with the PC/AT bus (sometimes called the Industry Standard Architecture). The PC/AT bus uses a compatible enhancement of the original PC bus, the PC/XT bus. The NCR 3125 uses a CPU compatible with the Intel 386 microprocessor family, while the GridPad uses a CPU compatible with the Intel 8086 microprocessor family. Since the vast majority of personal computers in use today are compatible with the IBM PC/AT design, it is advantageous to design the camera module to connect to PC/AT compatible computers.

The computer system includes optional "pod" attachments, which include electronics for specific applications. In FIG. 1, a rechargeable battery pack 10 constitutes one pod, while the camera module 2 constitutes a second pod. In such a system, the camera module 2 can be attached when needed for a particular application. The camera captures images and stores the images in the memory contained within the pen-based computer. When not needed, other pods may be attached, such as an RF transmitter pod (not shown) for allowing data to be transferred between the computer 4 and a central receiver (not shown). An exemplary imaging application is the automobile claims process, where there is a need to record data, including pictorial data, on vehicle damage in order to provide a repair estimate. In such an application, the computer 4 would store a set of claim forms, and the camera module 2 would be attached to the computer 4 to obtain still images which can immediately be incorporated into the forms, thereby creating "smart forms" including both images and the data needed for a particular application.

Figures 2, 3:
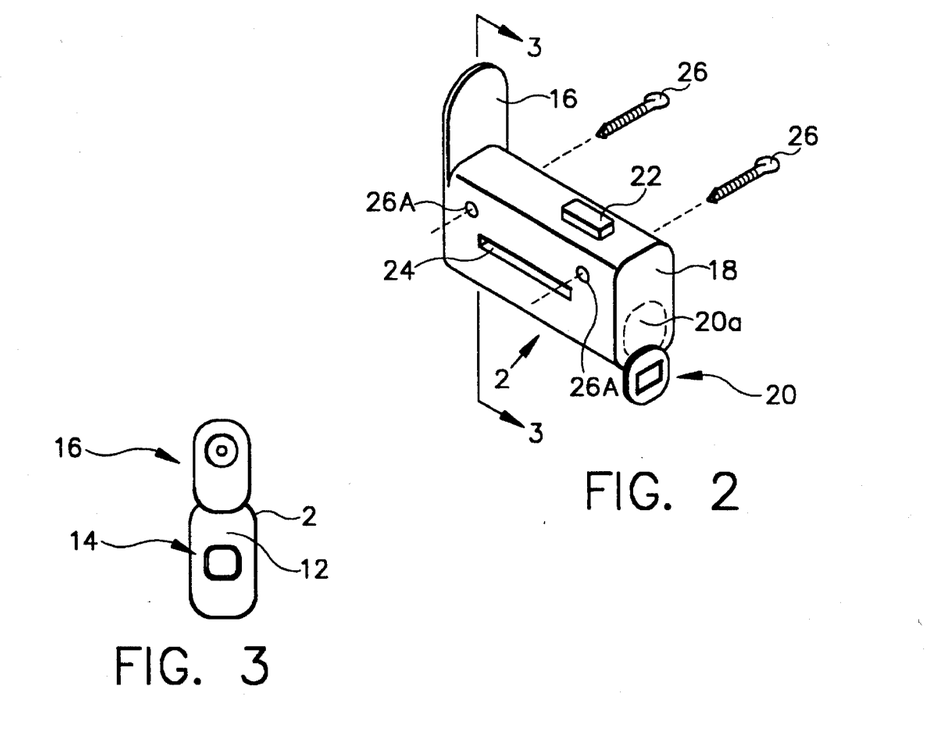
FIG. 2 is an illustration of the electronic still camera shown in FIG. 1.
FIG. 3 is an end elevation of the camera of FIG. 1 taken along the lines 3—3 of FIG. 2.

Referring to FIGS. 2 and 3, a front 12 of the camera module 2 includes a lens 14, which is covered with a flip-up flash 16 when not in use to protect the lens 14. A back 18 of the camera module includes an optical viewfinder 20, which slides out of (or alternatively, flips away from) a recess 20a on the back 18 of the camera. The slide-out design for the viewfinder 20 is advantageous because it takes up little room inside the camera module 2, and requires only a few optical elements. The camera module 2 also includes a capture switch 22 (i.e., a "shutter button") for taking the picture. The camera module 2 further includes an electrical interface connector 24 designed to mate with the bus connector 3 on the computer 4, thereby directly attaching the camera module 2 to the PC-compatible bus of the computer 4. This permits control of the camera module 2 from the computer 4, and provides a high speed parallel interface for rapidly transferring image data into the computer 4. In practice, it is desirable to physically attach the camera module 2 to the computer 4. Depending on the design chosen, the interface connector 24 may be sufficiently sturdy to provide mechanical as well as electrical attachment. Preferably, however, the camera module 2 would be secured to the computer by means of screws 26 secured through the holes 26a to threaded holes (not shown) on the computer 4.

Figure 4:
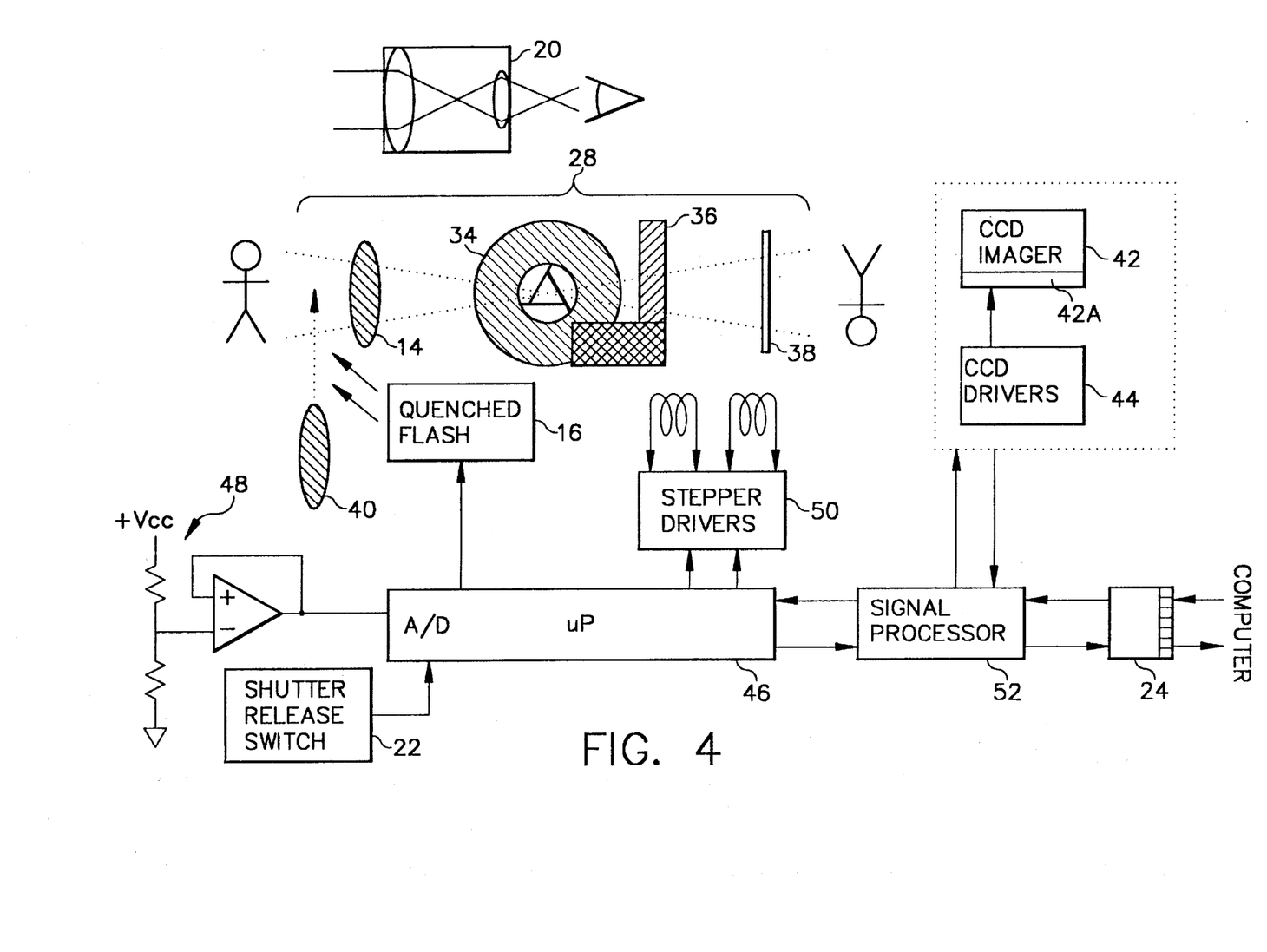
FIG. 4 is a block diagram of the major elements of the camera of FIG. 2.

FIG. 4 shows the subsystems of the camera module 2. An optical system 28 includes the lens 14, a diaphragm 34, a shutter 36, and an infrared blocking filter 38. To keep the system inexpensive, the lens 14 is fixed focus, and a close-up diopter lens 40 is optionally moved into the optical axis for close-up pictures. Image light is directed by the optical system 28 upon an image sensor 42, which is a charge-coupled device (CCD) sensor, such as the full frame sensor KAF-400 manufactured by Eastman Kodak Company, Rochester, N.Y. The timing of the read-out of the image sensor 42 through its horizontal read-out register 42a is controlled by a CCD clock driver circuit 44.

The sub-systems of the camera 20 are controlled by a microprocessor 46. In particular, the exposure conditions of the image are input to the microprocessor 46 from a photometer 48 and shutter release is initiated by the capture switch 22. Accordingly, the microprocessor 46 instructs a pair of stepper drivers 50 to set the diaphragm 34 and to operate the shutter 36, and, as needed, to fire the flash 16. The microprocessor 46 further interfaces with a signal processor 52, which controls the read-out clocking of the image sensor 42 and processes the image signal generated by the image sensor 42. The signal processor 52 provides the processed image signals to the computer 4 via the bus-compatible electrical interface connector 24.

Figure 5:
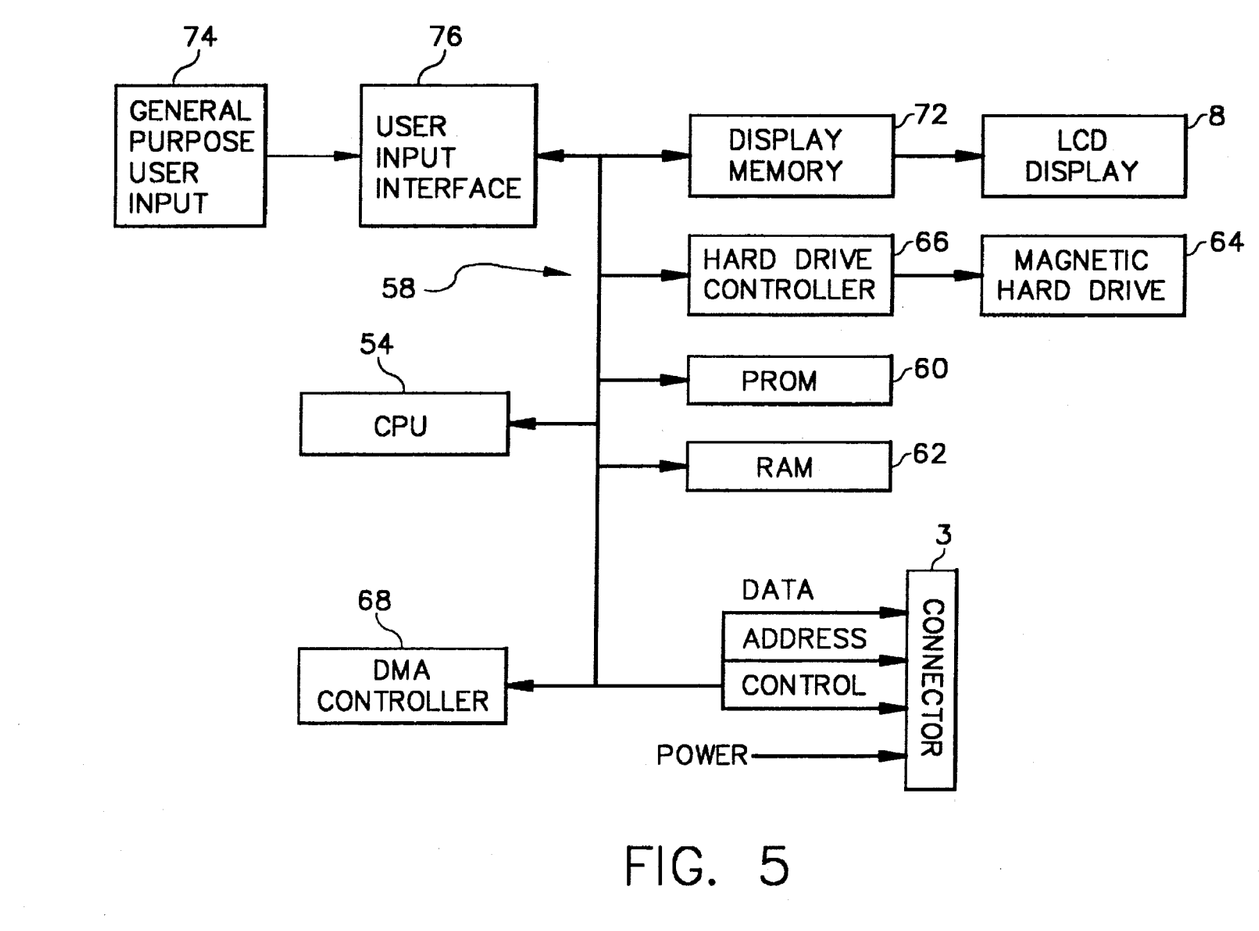
FIG. 5 is a simplified block diagram of a typical PC-compatible computer.
Figure 6:
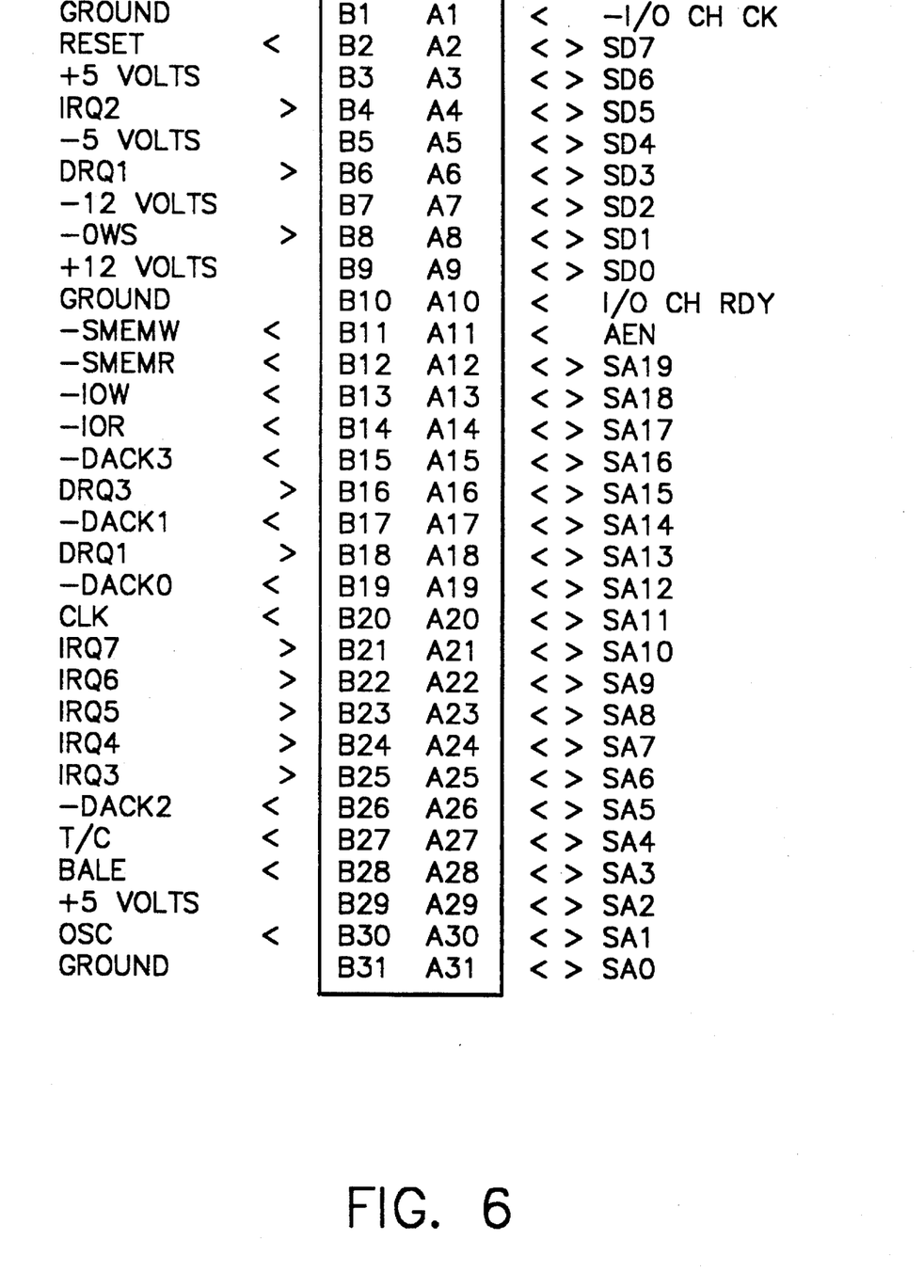
FIG. 6 is the pin-out diagram of the bus connector for a PC-compatible PC/XT bus.

A simplified block diagram of the computer 4, in particular, a PC-compatible computer, is shown in FIG. 5. The key component of the computer is the central processing unit, or CPU, 54. In a pen-based computer, the CPU can be, for example, a low power 16 bit CHMOS microprocessor such as the Intel 80C86A, manufactured by Intel Corp, Santa Clara, Calif. Alternatively, other processors, including CPUs compatible with the Intel 8088 CPU, Intel 80C286 CPU, or Intel 80386 or 80486 CPU families could be used. The CPU 54 connects to a standardized, industry-compatible bus 58, which is a set of shared lines exchange of three types of digital signals: data signals, address signals, and control signals. When an 8086 or 8088 compatible processor is used, the bus is known as the PC/XT bus, which utilizes 54 signal lines and 8 power/ground lines, including eight bits of data and twenty bits of address. When an 80286, 80386, or 80486 family CPU is used as the CPU in a "PC compatible" computer, the bus 58 is known as the PC/AT bus or ISA (Industry Standard Architecture) bus. The PC/AT bus is an enhancement of the PC/XT bus. An additional connector carries an extra eight bits of data, four bits of address, and extra control lines. FIG. 6 shows the 62 pin connector used in the PC/XT bus. The AT bus uses both the connector shown in FIG. 6 and the connector shown in FIG. 7. The connector pin names for the PC/XT bus are described in table 1, as follows.

TABLE 1

IBM PC/XT BUS SIGNALS

| SIGNAL NAME | PIN # | FUNCTION |
| --- | --- | --- |
| SA0–SA19 | A31–A12 | address (A0–A15 for I/O) |
| SD0–SD7 | A9–A2 | data |
| IOR | B14 | I/O read strobe |
| IOW | B13 | I/O write strobe |
| SMEMR | B12 | memory read strobe |
| SMEMW | B11 | memory write strobe |
| AEN | A11 | address enable |
| IRQ2–IRQ7 | B4, B25–B21 | interrupt request |
| RESET | B2 | power-on reset |
| DRQ1–DRQ3 | B18, B6, B16 | DMA request |
| DACK0–DACK3 | B19, B17, B26, B15 | DMA acknowledge |
| BALE | B28 | address latch enable |
| CLK | B20 | CPU clock |
| I/O CH CK | A1 | I/O error |
| I/O CH RDY | A10 | pull LOW for wait states |
| OSC | B30 | oscillator (3 × CPU clk) |
| T/C | B27 | DMA terminal count |
| OWS | B8 | Zero wait state |
| GND | B1, B10, B31 | signal & power gnd |
| +5 V DC | B3, B29 | +5 V supply |
| +12 V DC | B9 | +12 V supply |
| –5 V DC | B5 | –5 V supply |
| –12 V DC | B7 | –12 V supply |

These pins include power pins, which allow the plug-in board, and therefore the camera module 2, to be powered by the power supply (not shown) of the computer 4. The PC/AT connector, besides additional data and address lines, includes additional interrupt request, direct memory access (DMA) request, DMA acknowledge, and other special lines for 16-bit control. Note that these standard connectors are not available on the outside of the case enclosing the computer 4. Instead, the case must be opened to insert the connector 24, which may be elongated for this purpose, into an empty slot in the computer bus 58.

In some CPUs, for example, the Intel 8086 CPU, the data and address signals are typically time multiplexed on the same microprocessor pins, and control lines indicate whether the signals on these pins contains an address or data. The control lines are used to latch the data and address signals onto the separate address and data bus lines of the signal bus 58. The control lines carry a group of "interrupt request" signals, which are used by peripherals when they need attention from the CPU 54. The address lines include two different address spaces known as memory address space and I/O address space. The most significant bit (MSB) address lines are typically used only for memory address space. Therefore, these MSBs can be used to represent different commands, when addressing a device using I/O address space.

The PC-compatible bus 58 is connected to both programmable read only memory (PROM) 60 and random access memory (RAM) 62. The PROM 60 stores the BIOS (Basic Input/Output System) portion of the PC operating system software. The BIOS includes the bootstrap loader, which is executed when the computer is first powered on. The rest of the PC operating system is normally stored on a hard disk drive 64, which is connected to the bus 58 via a hard drive controller 66. The hard drive 64 is also used to store application programs and data, including the digital images captured by the camera module 2. Portions of the disk operating system (DOS), application programs, and data are typically downloaded to the RAM memory 62 before program execution. Since the access time of the RAM memory 62 is generally much less than the time required to access the hard drive 64, this decreases the program execution time. A direct memory access (DMA) controller 68 is typically used to rapidly move data between the hard drive 64 and the RAM memory 62. The DMA controller 68 transfers data between the memory address space and the I/O address space. The computer system further includes the LCD display 8, which is normally connected to a display RAM memory 72 that is loaded by the CPU 54 via the bus 58, and at least one general purpose user input device 74, such as a keyboard, mouse, or the pen stylus 6. The user input device 74 is connected to the bus 58 via a user input interface 76, which may include a separate microprocessor.

The computer 4 includes the PC-compatible bus connector 3, which is accessible from the outside of the computer case. By attaching the camera module 2 to the connector 3, the camera module 2 is able to access the PC-compatible bus 58 in order to transfer image data from the CCD imager 42 to the computer 4, and in general to allow the camera module 2 to be controlled using the general purpose user input 74. PC-compatible computers ordinarily include internal "slots" with a standard bus connection, to allow users to purchase plug-in boards having additional memory, modems, etc., in order to expand the capabilities of their computer. This interface provides what is known as the "I/O bus?, or "I/O channel", using the standard connectors shown in FIGS. 6 and 7. In order to connect the camera module 2 to such computers, the interface connector 124 may include a plug-in extender board for inserting into the bus connection "slot" on the computer 4. (Although not specifically shown, the "slot" would enclose the connector 3 shown in FIG. 1.)

Figure 7:
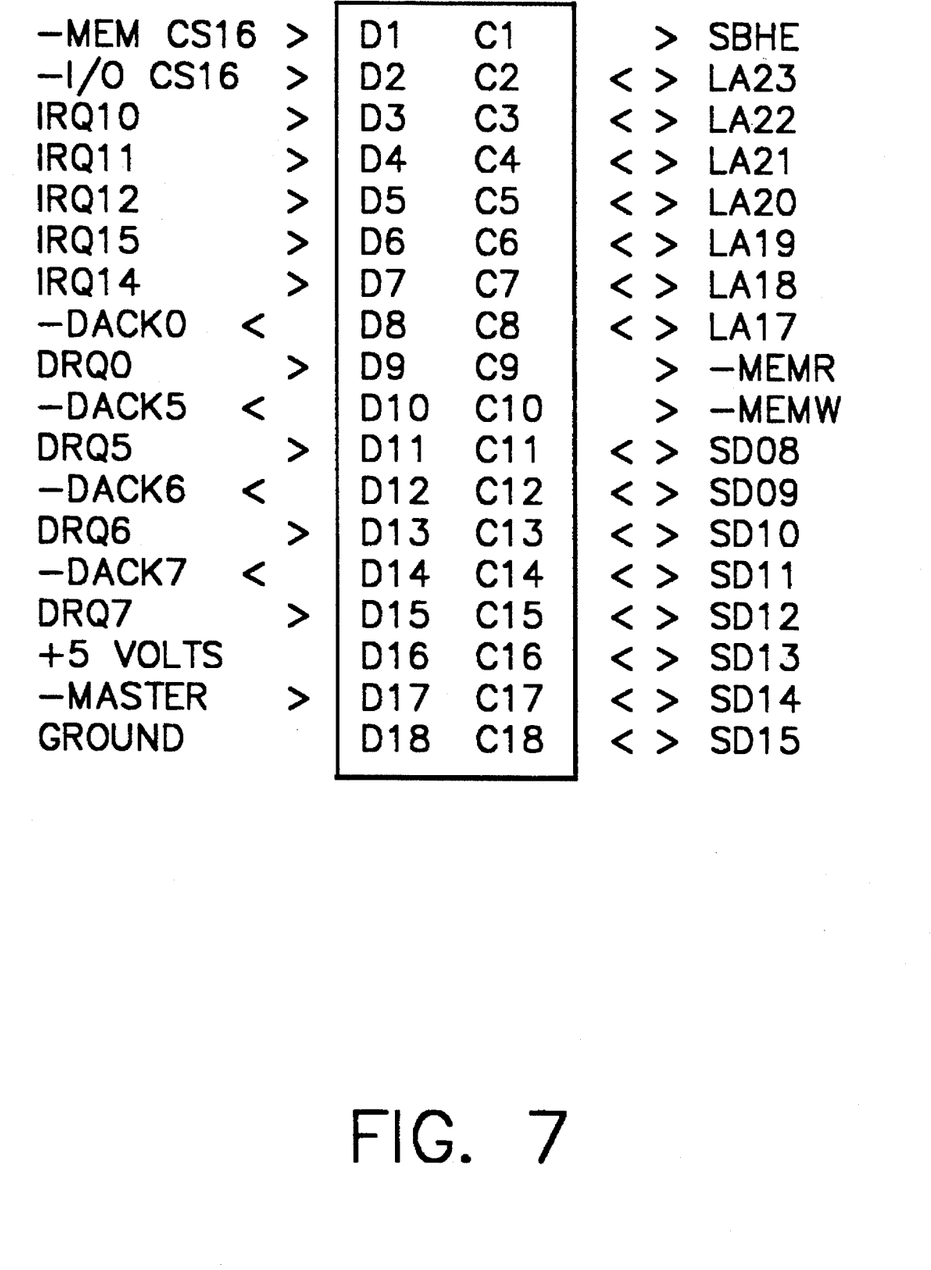
FIG. 7 shows the pin-out diagram of the bus connections which together with FIG. 6 make up a PC-compatible PC/AT bus.

In one embodiment of the invention utilizing the PC/AT bus, the camera includes a 62 pin card edge connector and a 36 pin card edge connector, providing the connections shown in FIGS. 6 and 7, while the computer includes the appropriate female connectors accessible from the exterior of the case, to allow the camera module 2 to attach to the computer 4. As shown earlier, the camera module 2 is attached to the computer 4 using the screws 26. When the computer 4 is used without the camera module 2, a plate (not shown) is screwed into the computer, to prevent the connector 3 from being abused. In other embodiments, other types of physical connectors can be used. Furthermore, the connectors 3 and 24 may have fewer than 98 pins, since some of the bus signals may not be required by the camera.

Figure 8A:
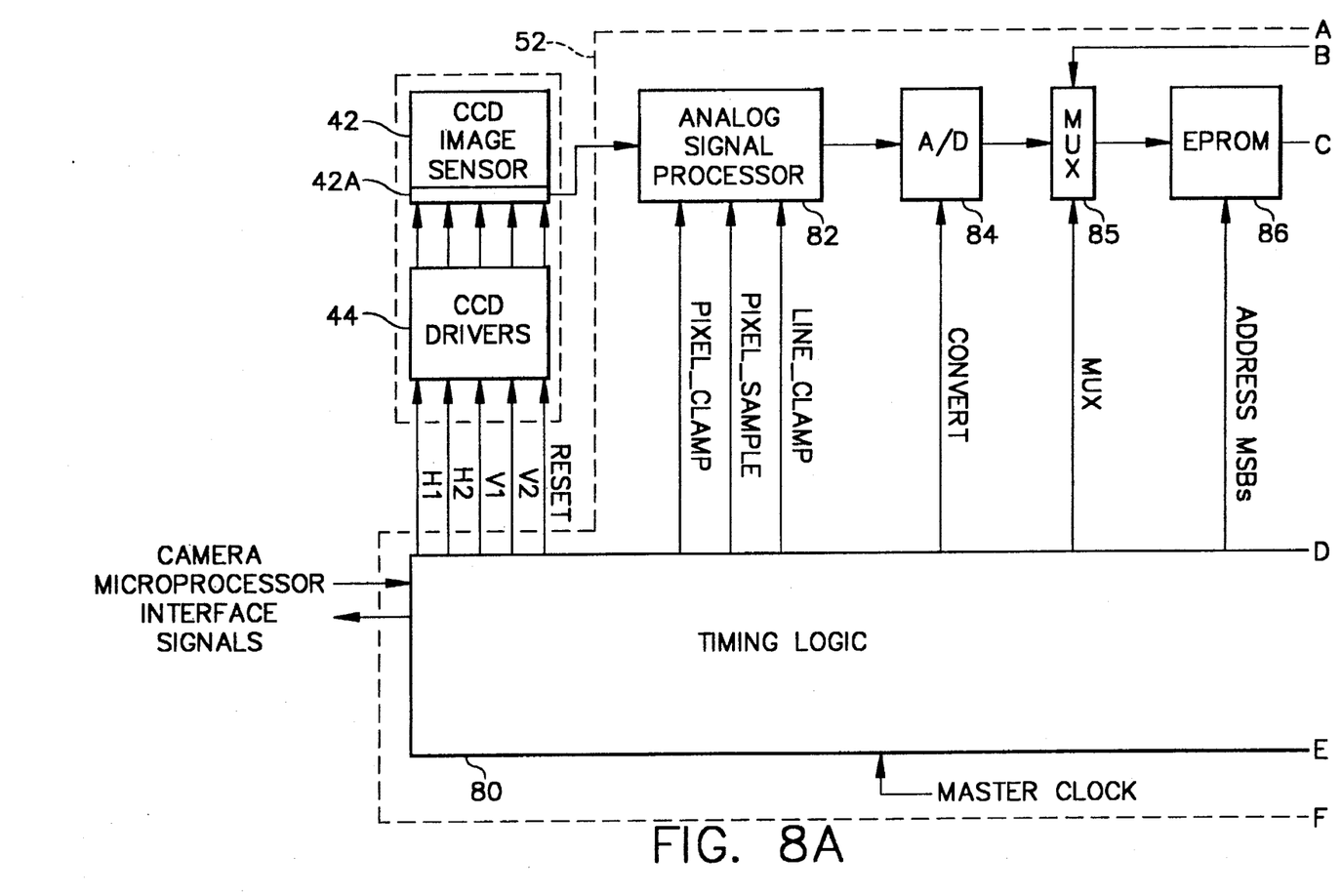
FIG. 8 is a more detailed diagram of the signal processor subsystem shown in FIG. 4.
Figure 8B:
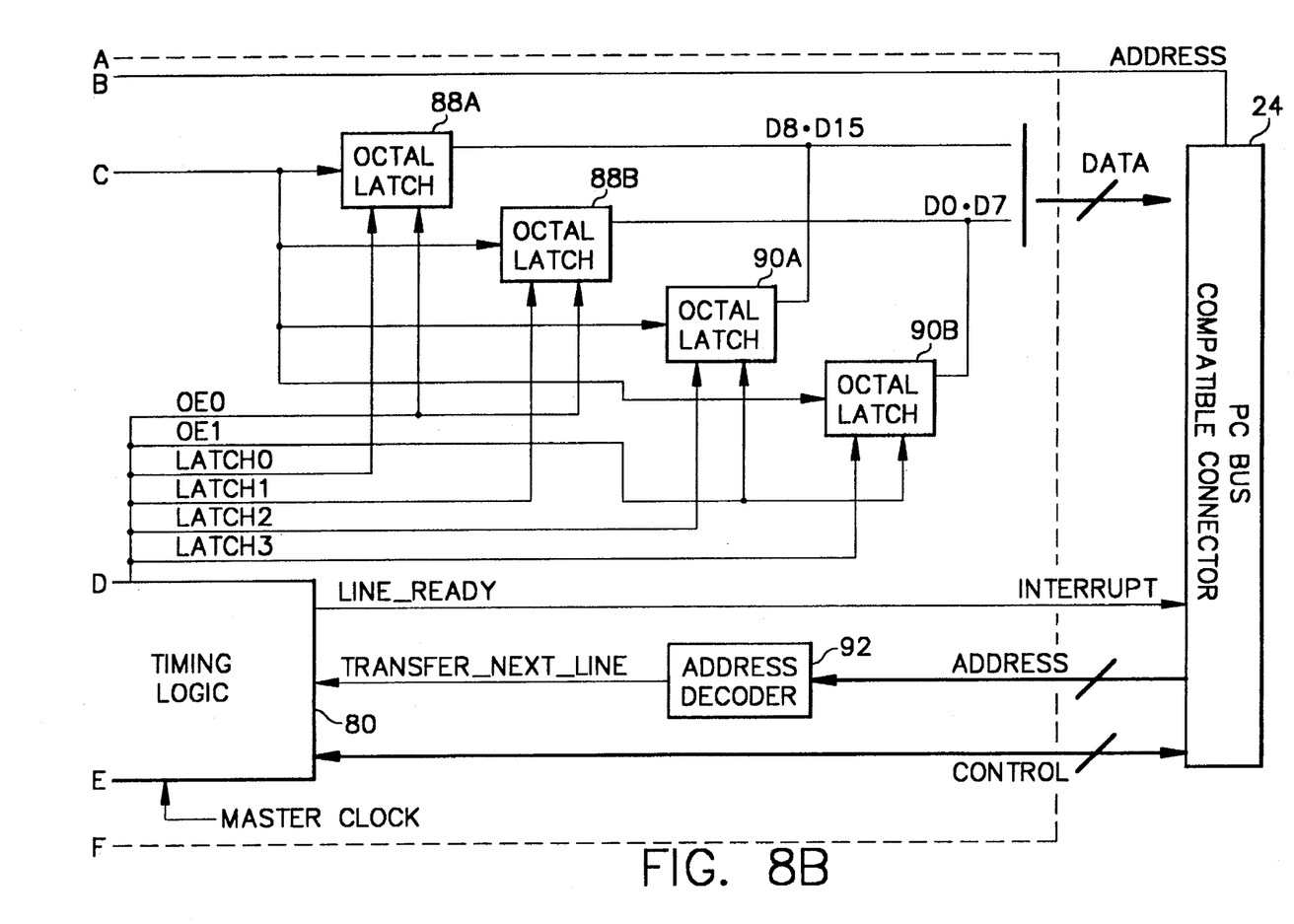

Details of one embodiment of the signal processor 52 (FIG. 4) are shown in FIG. 8. A logic circuit 80 (such as Model EPS464 or Model EPM7096, integrated circuits manufactured by Altera Corp., San Jose, Calif.) provides the timing signals to control the image sensor 42 and the various parts of the signal processor 52. In particular the logic circuit 80 provides the horizontal and vertical clocking signals H1,H2,V1,V2 to read an image signal from the sensor 42 and the timing signal RESET to initiate each pixel read-out period. The output of the sensor 42 is initially processed by an analog signal processor 82 incorporating, e.g., a gain stage and a correlated double sampling circuit, and converted to a digital signal by an analog-to-digital (A/D) converter 84. The digitized signal is then processed by an EPROM look-up table (LUT) 86 that stores the white balance and gamma correction curveshapes, and information about the camera.

The LUT 86 can also store a camera serial number, location of sensor defects, the structure of a color filter array used on the sensor 42, color matrix coefficients optimized for a particular image sensor, etc. Moreover, the LUT 86 may also store the computer program which is used (by the computer) to operate the camera and to process the images from the sensor color filter array to obtain a full resolution, color corrected image. Such data is programmed into a portion of the EPROM memory 86, which is not used to provide the white balance and gamma correction look-up tables, when the camera module 2 is manufactured. The data is downloaded from the EPROM memory 86 in the camera module to the RAM memory 62 in the computer. To download the information, a multiplexer 85 is used to allow the computer to address the EPROM address least significant bit (LSB) lines which are normally provided by the A/D converter 84, while the timing logic 80 provides MSB address values which contain the required data, instead of the MSB values which provide the white balance and gamma correction curveshape tables.

The digitized signal processed by the LUT 86 is then provided to two sets of octal latches, 88a, 88b, and 90a, 90b. Each octal latch stores one pixel value. While one set (88a, 88b or 90a, 90b) of latches is being loaded, the pixel values stored in the other set from the previous two pixels are read into the computer 4 through the 16-bit data lines D0–D15 on the bus-compatible connector 24. The camera module 2 is controlled by signals generated by the computer 4 and applied to the address lines, which are decoded in an address decoder 92, and to the control lines of the bus 58.

Figure 10:
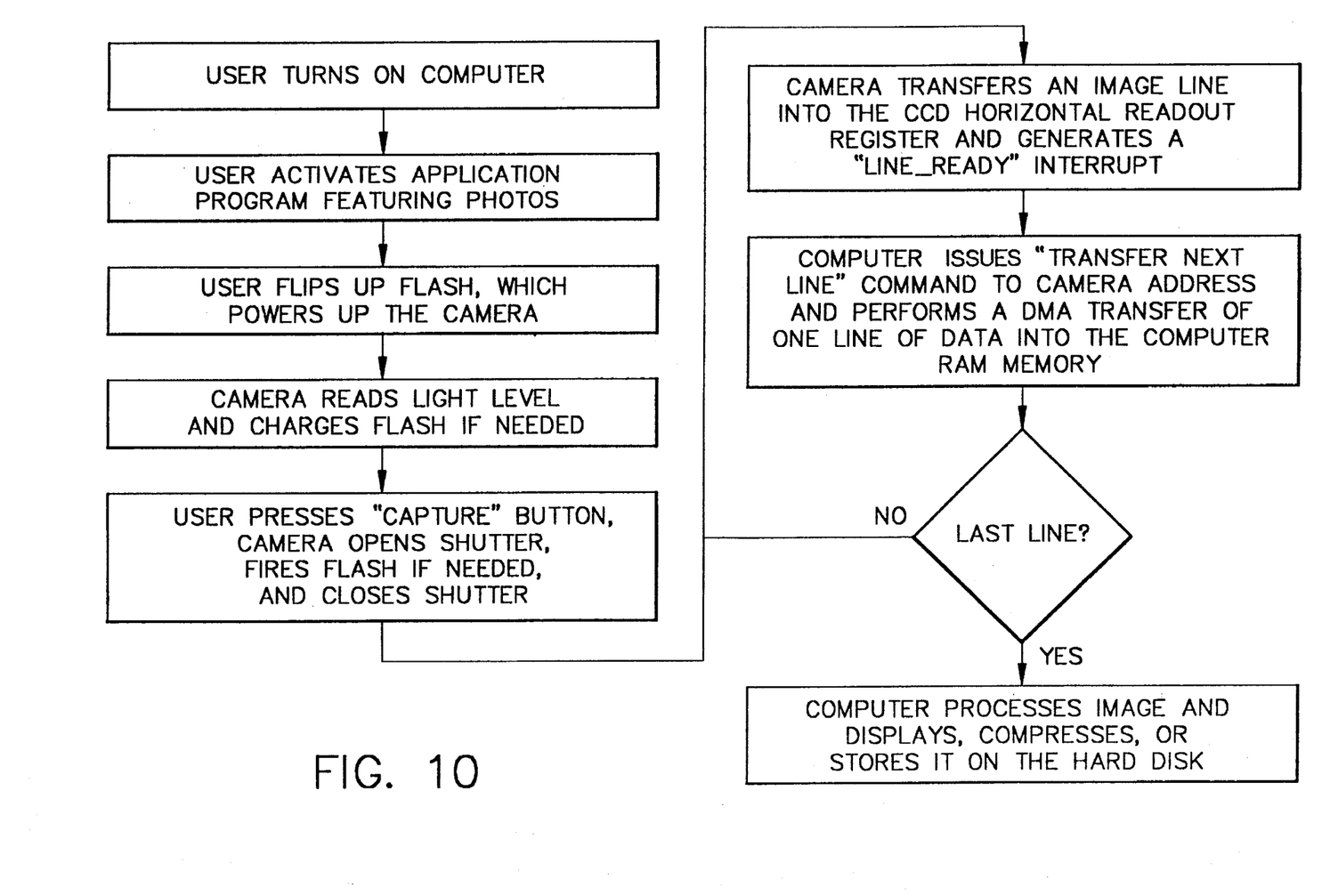
FIG. 10 is a flow diagram of the image capture process.

The operation of the image capture system of FIGS. 4, 5 and 8 proceeds as shown in the flow chart of FIG. 10, in particular for a direct memory access (DMA) mode of operation. The user begins by connecting the camera module 2 to the computer 4 via the connectors 3 and 24, and turns on the computer 4. This activates an application program. The user then opens a "camera" application program by using the general purpose user input 74 and selects capture parameters from a menu displayed on the LCD display 8. A typical application might utilize an electronic "smart form", which requires data to be entered via the LCD display 8 and the stylus 6, and which also requires a picture. The capture parameters may include color (8, 16, or 24 bit) or monochrome (1 or 8 bit), full resolution or subsampled, and store direct to disk, compress before storing, or convert to a standard metric before storing. Therefore, depending on the capture parameters selected, the data is either stored directly from RAM 62 to the hard disk 64 (or other non-volatile computer memory), compressed before storage using conventional methods, or converted before storage to a full resolution color image.

To take the picture, the user flips up the flash 16 and slides down the viewfinder 20. This closes a hidden switch (not shown) which powers up the camera. The camera, using the photometer 48, measures the ambient light level and charges the flash 16 if the ambient light level is low. The user frames the image using the optical viewfinder 20, and depresses the capture button 22. This begins a sequence which actuates the diaphragm 34, opens the shutter 36, fires the flash 16 if required, and closes the shutter 36. One line of the image is then transferred from the vertical register of the CCD imager 42 to the horizontal readout register 42a. Next, the timing logic 80 generates a "line-ready" interrupt of the computer's CPU using a PC I/O bus interrupt line.

In response to the interrupt, the CPU 54 instructs the DMA controller 68 to begin transfer of one line of data from the camera module 2 over the bus 58 to the computer's RAM memory 62. The DMA transfer is controlled by the control line signals on the bus 58. The data is provided from the camera in groups of two 8 bit pixels at a time, to rapidly transfer the image from the CCD imager 42 to the computer RAM memory 62. At the end of each line of the image (768 pixels for the Kodak KAF-0400 sensor), the timing logic 80 transfers another image line into the horizontal readout register 42a and then generates another "line-ready" interrupt.

Figure 9A:
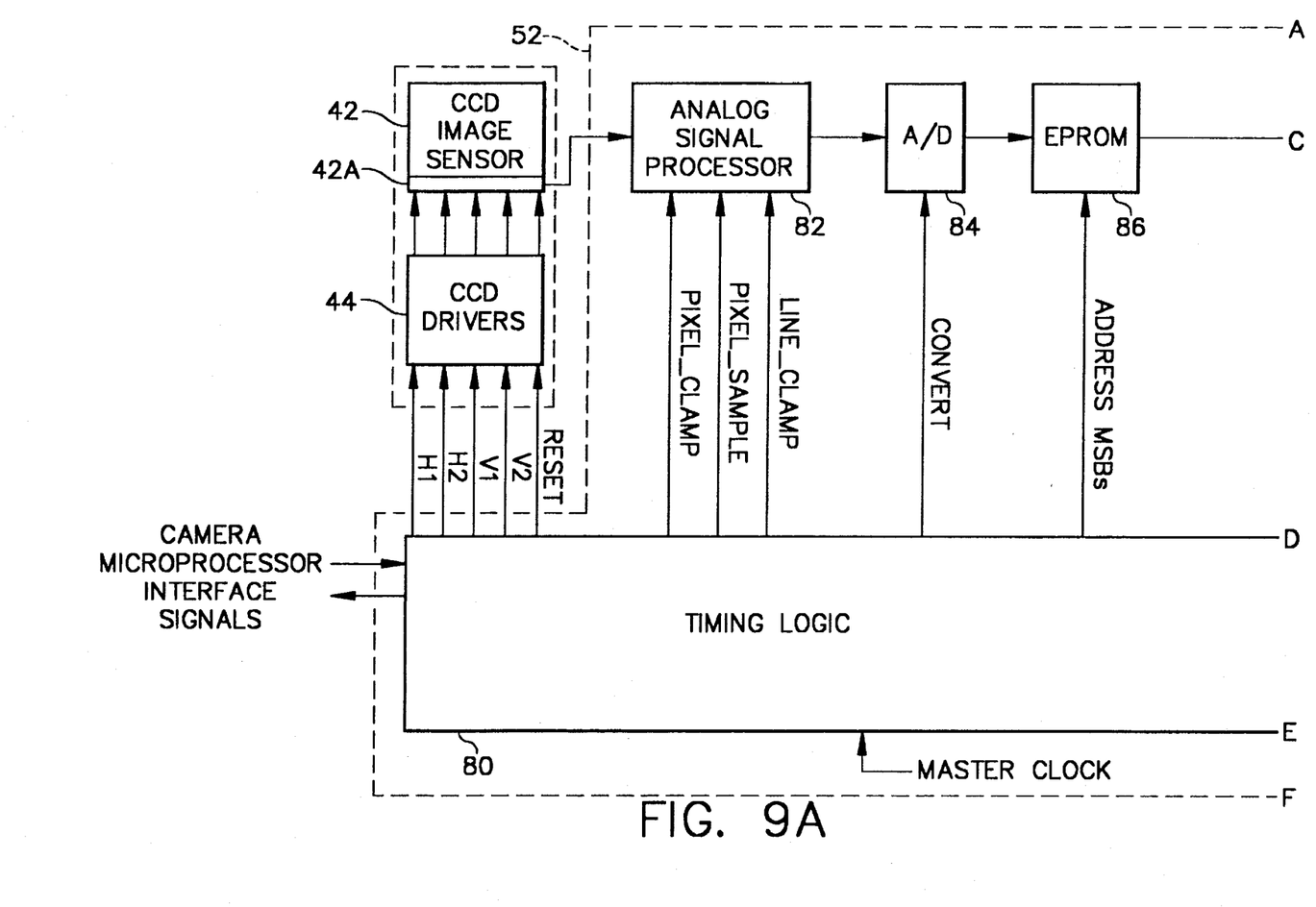
FIG. 9 shows a second embodiment of the signal processor subsystem shown in FIG. 4.
Figure 9B:
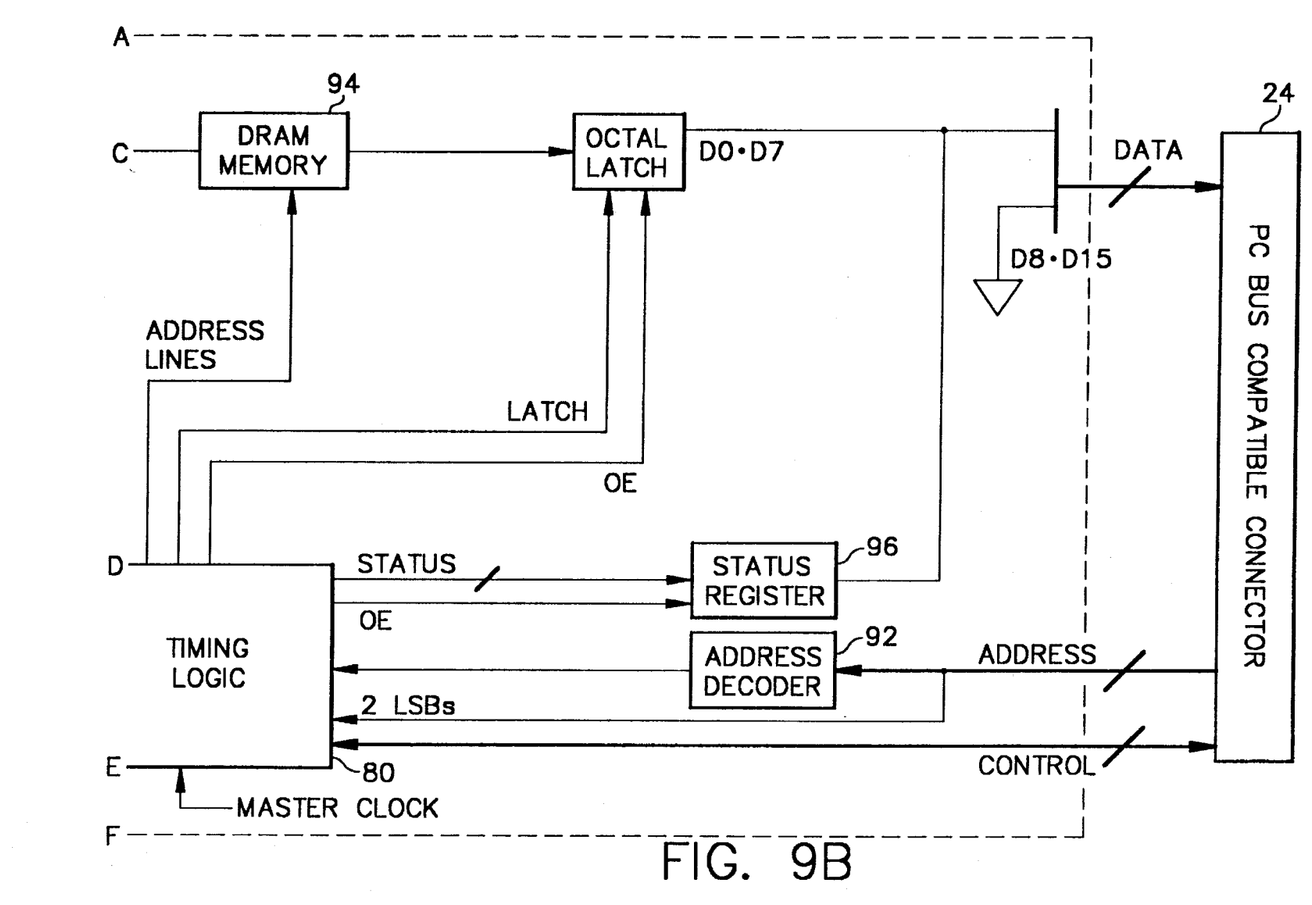

In a second embodiment of the signal processor 52 shown in FIG. 9, the camera supplies data using only 8 bits out of the 16 data bits available on the PC/AT connector. In addition, a DRAM buffer memory 94, capable of storing one entire image from the CCD imager 42, is inserted between the EPROM 86 and the interface connector 24 to substitute for the four octal latches in FIG. 8. This substitution lets the data transfer to the computer occur at any time following the image capture, without being synchronized to the sensor-readout. Such an unsynchronized transfer is useful in situations where the DMA transfer occurs at a slow enough rate that the "dark current" noise build-up in the sensor 42 would be too large. It is also useful in situations where the CPU 54 is performing many other tasks while reading out the image, so that if the DRAM memory 94 were not used, the CCD horizontal shift register clocking would need to be interrupted, which could lead to noise in the image. In addition, a status register 96 is used instead of interrupt lines, to provide a status signal to the CPU 54 when an image has been captured and is ready to be transferred. This status register 96 is a latch, controlled by the camera module timing logic 80, which is multiplexed onto the same data lines of the bus 58 as the image data. In addition, the address decoder 92 directly passes the 2 LSBs of the PC bus address directly to the timing logic 80. These two LSBs provide various commands to the timing logic. For example, the computer can instruct the camera module to turn on the flash or to take a picture.

The invention has been described in detail with particular reference to a presently preferred embodiment, but it will be understood that variations and modifications can be effected within the spirit and scope of the invention. For example, the picture-taking sequence could be initiated from the user input device 74 that is part of the computer 4, and the camera module 2 would then not require any user input device, such as the capture button 22. Moreover, the camera module 2 could be an integral part of the computer 4, i.e., the computer 4 would inherently include the capability of being a camera as well as a computer. In that case, the elements of the camera shown in FIG. 4, and the signal processor 52 shown further in FIGS. 8 and 9, would be additional parts of the PC-compatible computer shown in FIG. 5. The principal difference would be that the PC bus-compatible connectors 3 and 24 would be replaced by a direct connection of the signal processor 52 to the signal bus 58.

What is claimed is:

1. An electronic camera for use with a portable computer, wherein the portable computer includes a plurality of digital devices coupled to a central processing unit (CPU) by a standardized, industry-compatible, internal signal bus having a plurality of signal lines, said camera comprising:

an image sensor for generating image data representative of scene to be imaged;

timing means for driving said image sensor to produce lines of image data;

digitizing means for digitizing the lines image data produced by the image sensor;

means for mechanically attaching the camera to the portable computer;

bus-compatible connector means for transferring the digitized image data from the digitizing means to the internal signal bus of the portable computer without altering the digitized image data in accordance with a communication protocol, wherein the bus-compatible connector means includes a plurality of signal lines that directly correspond to the signal lines of the internal signal bus.

2. An electronic camera as claimed in claim 1, wherein said internal signal bus of the portable computer includes an interrupt request line, and wherein said timing means applies an interrupt signal to the interrupt request line via the bus compatible connector means after a line of image data is produced, in order to interrupt the operation of the CPU of the portable computer and thereby initiate the transfer of the digitized image data directly to the internal signal bus of the portable computer.

3. An electronic camera as claimed in claim 1, wherein said internal signal bus of the portable computer includes data lines, said camera includes a status register, and wherein said timing means triggers the status register to apply a status signal to a data line via the bus-compatible connector means after a line of image data is produced, in order to ready the electronic camera for an input instruction from the CPU of the portable computer.

4. An electronic camera as claimed in claim 1, wherein said internal signal bus of the portable computer includes a direct memory access (DMA) request line, wherein said digital devices coupled to said internal signal bus include a DMA controller and a memory, and wherein said timing means applies an interrupt signal to the DMA request line via the bus-compatible connector means after a line of image data is produced, in order to interrupt the operation of the CPU of the portable computer and thereby initiate a direct transfer of image data from the camera to the memory under control the DMA controller.

5. An electronic camera as claimed in claim 1, wherein said camera includes plural latches for temporarily storing a line of digitized image data before it is provided to the internal signal bus of the portable computer.

6. An electronic camera as claimed in claim 1, wherein said camera includes an image memory for storing the lines of digitized image data constituting the image before the data is provided to the internal signal bus of the portable computer.

7. An electronic camera as claimed in claim 1, further including a programmable memory containing camera processing parameters, wherein the parameters are downloaded to the CPU of the portable computer via the bus-compatible connector means and the internal signal bus in response to signals received from said timing means.

8. An electronic camera for use with a computer, wherein the computer includes a digital processing device, a data entry device, a data storage device, a data display device, and an internal signal bus for conveying data, address, and control signals between the devices, said signal bus including a bus connector for connecting said signal bus to additional devices, said camera comprising:

a camera module including an image sensor and an analog-to-digital converter for digitizing image data output from the sensor;

connective means, externally accessible from said camera module, for connecting said camera module to the bus connector; and data transfer means included within said camera module for presenting the digitized image data directly to the signal bus through the bus connector without using a communication interface that alters the digitized image data in accordance with a communication protocol.

9. An electronic camera as claimed in claim 8 wherein said camera module includes means for controlling readout of the image sensor and means for providing an interrupt signal to said connecting means and therefrom to the signal bus of the computer whenever said controlling means produces a predetermined amount of image data.

10. An electronic camera as claimed in claim 9 wherein said predetermined amount of image data is a line of image data.

11. An electronic camera as claimed in claim 8 wherein said signal bus is a PC compatible bus and wherein said connecting means includes a PC compatible connector.

12. An electronic camera as claimed in claim 8 wherein said camera module includes means for controlling readout of the image sensor, a memory, and means for generating a status signal whenever said controlling means has loaded a predetermined amount of image data into the memory.

13. An electronic camera as claimed in claim 12 wherein said image sensor provides a frame of image data and said predetermined amount of image data is the full frame of image data.

14. An electronic camera as claimed in claim 12 wherein said presenting means presents the status signal to the signal bus through said bus connector.

15. An electronic camera for use with a PC compatible computer, wherein the PC compatible computer includes a digital processing device, a data entry device, a data storage device, a data display device, and a signal bus for conveying data, address, and control signals between the devices, said signal bus including a bus connector for connecting said signal bus to additional devices, said camera comprising:

a camera module including an image sensor and an analog-to-digital converter for digitizing image data output from the sensor;

bus-compatible means presented externally from the camera module for connecting said camera module to the bus connector of the computer; and data transfer means for controlling the transfer of image data from said sensor directly to the data storage device via the signal bus without utilizing an intermediate communication interface that alters the image data in accordance with a communication protocol.

16. An electronic camera as claimed in claim 15 wherein said controlling means includes means for controlling readout of the image sensor and means for providing an interrupt signal via the signal bus to the digital processor whenever said controlling means produces a line of image data.

17. An electronic camera as claimed in claim 15 wherein said camera module includes a shutter release switch and wherein said controlling means is responsive to actuation of said shutter release switch.

18. An electronic camera as claimed in claim 15 wherein said controlling means is responsive to actuation of the data entry device connected through the signals bus to the digital processor.

19. An electronic camera as claimed in claim 16 wherein said camera module includes a frame memory and said controlling means includes means for reading a frame of image data into said memory.

20. An electronic camera as claimed in claim 19 wherein controlling means includes means for generating a status signal that is applied to the signal bus whenever said reading means produces a frame of image data.

21. A portable PC-compatible computer system including a digital processing device, a data entry device, a data storage device, a data display device, and an internal signal bus for conveying data, address, and control signals between the devices, the improvement wherein said computer system further includes:

an image sensor;

an optical system for directing image light upon said image sensor;

an analog-to-digital converter for digitizing image data output from said sensor;

connecting means for connecting the output of said analog-to-digital converter to the signal bus; and data transfer means for controlling the transfer of digitized image data from said sensor directly to the data storage device via the signal bus without using an intermediate communication interface that alters the digitized image data in accordance with a communication protocol.

22. A computer system as claimed in claim 21 wherein said controlling means includes means for controlling readout of the image sensor and means for providing an interrupt signal via the signal bus to the digital processor whenever said controlling means produces a line of image data.

23. A computer system as claimed in claim 22 wherein said computer includes a shutter release switch and wherein said controlling means is activated in response to actuation of said shutter release switch.

24. A computer system as claimed in claim 22 wherein said controlling means is activated in response to actuation of the data entry device connected through the signal bus to the digital processor.

25. A computer system as claimed in claim 21 wherein said computer includes a frame memory and said controlling means includes means for reading a frame of image data into said memory.

26. A computer system as claimed in claim 25 wherein controlling means includes means for generating a status signal that is applied to the signal bus whenever said reading means produces a frame of image data.

* * * * *